(12) United States Patent
Noonan et al.

(10) Patent No.: US 11,248,680 B2
(45) Date of Patent: Feb. 15, 2022

(54) SYSTEM AND METHOD TO REDUCE PARASITIC LOADS ON AN ENGINE OF A HARVESTING MACHINE

(71) Applicant: DEERE & COMPANY, Moline, IL (US)

(72) Inventors: James T. Noonan, Ankeny, IA (US); Dwayne B. Watt, Coffeyville, KS (US); Cecil H. Wise, Jr., Coffeyville, KS (US); Steven D. Wallestad, Ankeny, IA (US); Mark A. Cracraft, Ankeny, IA (US); Jerry E. White, Ankeny, IA (US); Cole D. Miller, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 697 days.

(21) Appl. No.: 16/202,460

(22) Filed: Nov. 28, 2018

(65) Prior Publication Data
US 2020/0166100 A1  May 28, 2020

(51) Int. Cl.
*F16H 1/22* (2006.01)
*A01D 69/06* (2006.01)
(Continued)

(52) U.S. Cl.
CPC ............. *F16H 1/22* (2013.01); *A01D 69/06* (2013.01); *A01D 69/08* (2013.01); *F16D 13/52* (2013.01); *F16D 25/0638* (2013.01); *F16D 48/06* (2013.01); *F16D 2500/1045* (2013.01); *F16D 2500/10418* (2013.01); *F16D 2500/111* (2013.01); *F16D 2500/3067* (2013.01); *F16D 2500/70424* (2013.01)

(58) Field of Classification Search
CPC .......... F16H 1/22; A01D 69/06; A01D 69/08; F16D 48/06; F16D 2500/10418; F16D 2500/1045; F16D 2500/111; F16D 2500/3067; F16D 2500/70424
See application file for complete search history.

(56) References Cited

U.S. PATENT DOCUMENTS

| 6,672,399 B2 * | 1/2004 | Sprinkle ................. E02F 3/384 172/7 |
| 8,006,471 B2 | 8/2011 | Owen |

(Continued)

*Primary Examiner* — Edwin A Young
(74) *Attorney, Agent, or Firm* — Taft Stettinius & Hollister LLP; Stephen F. Rost (57) ABSTRACT

A hydraulic power module for a crop harvester, and in particular a cotton harvester, having an engine. The hydraulic power module includes a main drive gear, a drive shaft extending through the main drive gear, and a clutch operatively connected to the drive shaft, wherein the clutch has an engaged position and a disengaged position. The engaged position of the clutch fixedly connects the main drive gear to the drive shaft and the disengaged position of the clutch disconnects the main drive gear drive from the drive shaft. The hydraulic power module further includes a first pump device directly coupled to the drive shaft, wherein the first pump device is driven by the drive shaft during rotation of the drive shaft. A second pump device is indirectly connected to the drive shaft through the clutch, and is driven by the drive shaft when the clutch is in the engaged position.

20 Claims, 7 Drawing Sheets

(51) Int. Cl.
    *A01D 69/08*     (2006.01)
    *F16D 13/52*     (2006.01)
    *F16D 48/06*     (2006.01)
    *F16D 25/0638*     (2006.01)

(56) References Cited

U.S. PATENT DOCUMENTS

| | | | | |
|---|---|---|---|---|
| 2008/0214349 | A1* | 9/2008 | Liebherr | F16H 47/04 475/81 |
| 2013/0105268 | A1* | 5/2013 | Vergara | B60K 17/28 192/85.63 |
| 2015/0351324 | A1* | 12/2015 | Schiewer | A01D 69/06 74/720 |

* cited by examiner

SYSTEM AND METHOD TO REDUCE PARASITIC LOADS ON AN ENGINE OF A HARVESTING MACHINE

FIELD OF THE DISCLOSURE

The present invention generally relates to a harvesting machine, and more particularly to a system and method to reduce parasitic loads when starting the engine of a harvesting machine.

BACKGROUND

Agricultural equipment, such as a tractor or a self-propelled harvester, includes mechanical systems, electrical systems, hydraulic systems, and electro-hydraulic systems.

When harvesting cotton, for instance, cotton from cotton plants is harvested by a mobile cotton harvester, which includes a header that engages the cotton plant to remove the cotton from the field. The removed cotton is delivered to a relatively large basket which receives and holds the harvested cotton. Many known cotton harvester baskets include apparatus for distributing and compacting the cotton to some extent, primarily to increase the amount of cotton which can be held in the basket.

Mobile cotton harvesters are often self-propelled cotton harvesting machines which typically come in two forms, namely a cotton stripper vehicle and a cotton picker vehicle. The cotton stripper is designed to remove the cotton bolls entirely.

A cotton picker, on the other hand, "picks" the cotton from the bolls, typically by using revolving spindle fingers or prongs. Cotton pickers leave the cotton plant, and unopened bolls, intact, such that a given field is sometimes harvested more than once during a growing season, the pickers making repeated trips through the cotton field as the bolls ripen.

Self-propelled cotton harvesters can also include a cab where an operator is located to operate and/or monitor the operation of cotton harvester. The cab includes operator controls, often including a display, to provide the operator with harvester status as well as to provide operator controls for adjusting operating conditions of the harvester.

The cotton harvester further includes a vehicle propulsion system, including an engine coupled to a transmission, which is in turn coupled to a drive train, as is understood by those skilled in the art.

Many harvesting vehicles, including cotton harvesting machines, drive hydraulic pumps that act as the primary engine power consumer. When starting an engine, these pumps can experience significant parasitic power draw. Especially under cold conditions, the extra parasitic pump load can prevent the engine from attaining a sufficient number of revolutions per minute (RPM) required to support engine starting.

Engines can have different options for starter voltages (i.e. 12 Volt (V), 24 V, and others). The higher starter voltages increase the potential for being able to start an engine having added parasitics, even in colder weather. Many vehicles, however, utilize a 12V electrical architecture. So while it is cost effective to keep the vehicle starting system as a 12V system, starting capability is compromised when compared to higher voltage starters.

Not being able to start the engine not only has implications for the end customer of an agricultural vehicle, but can be a major problem for work vehicles used at a manufacturing facility and at loading ports, where outside ambient temperatures are not conducive to reliable engine starting. Such work vehicles include construction vehicles, forestry vehicles, lawn maintenance vehicles, as well as on-road vehicles such as those used to plow snow, spread salt, or vehicles with towing capability. Many of the work vehicles include powered system, including pump system, driven by the engine which present parasitic loads to the work vehicle's engine.

What is needed therefore is system and method to reduce parasitic loads experienced by an engine of a harvesting machine during startup.

SUMMARY

A system and method is disclosed to reduce parasitic loads when starting the engine of a work vehicle, such as an agricultural harvesting machine, by automatically disengaging one or more powered devices from the engine during engine starting. The one or more powered devices are automatically engaged after the engine has met a threshold for speed, allowing full functionality of the powered devices. Powered devices are operatively connected to a drive shaft through a clutch wherein clutch disengagement and reengagement occurs automatically during the engine starting process. Additionally in one embodiment, the clutch is held in a disengaged state when conditions are not satisfactory for operating the powered devices. By being able to disconnect one or more powered devices from the engine flywheel during starting, the likelihood of starting is significantly improved.

In one embodiment, there is provided a hydraulic power module for a crop harvester having an engine. The hydraulic power module includes a main drive gear, a drive shaft extending through the main drive gear, and a clutch operatively connected to the drive shaft. The clutch includes an engaged position and a disengaged position, wherein the engaged position of the clutch fixedly connects the main drive gear to the drive shaft and the disengaged position of the clutch disconnects the main drive gear drive from the drive shaft. A first pump device is directly coupled to the drive shaft, wherein the first pump device is driven by the drive shaft during rotation of the drive shaft. A second pump device is indirectly connected to the drive shaft through the clutch, wherein the second pump device is driven by the drive shaft when the clutch is in the engaged position.

In one example of this embodiment, the first pump device includes a first plurality of hydraulic pumps wherein each one of the first plurality of pumps provides a different function. In a second example, one of the first plurality of pumps includes a steering pump and another of the first plurality of pumps comprises a scavenge pump. In a third example, the second pump device includes a second plurality of hydraulic pumps wherein each of the second plurality of pumps provides a different function. In a fourth example, one of the second plurality of pumps includes a header pump and another of the second plurality of pumps includes a cleaner pump. In a fifth example, the hydraulic power module includes a third pump device having a third plurality of third pumps wherein each of the third plurality of pumps provides a different function. In a sixth example, the hydraulic power module includes a first intermediate gear coupled to the main drive gear and the first pump device, wherein rotation of the main drive gear drives the first intermediate gear to drive the first pump device. In a seventh example, the hydraulic power module includes a second intermediate gear coupled to the main gear and the second pump device, wherein rotation of the main gear drives the second intermediate gear to drive the second pump device. In an eighth example, the hydraulic power module includes a hydraulic reservoir configured to hold a supply of hydraulic fluid for driving the first pump device and the second pump device and a fluid level sensor disposed in the hydraulic reservoir, wherein the fluid level sensor is configured to transmit a level signal indicating a level of hydraulic fluid in the hydraulic reservoir. In a ninth example, the hydraulic power module includes a controller operatively connected to the fluid level sensor and operatively connected to the clutch, wherein fluid level sensor transmits a level signal to the controller and the controller in response to the level signal prevents the pressure plate from being located at the second position. In a tenth example, the hydraulic power module includes a third intermediate gear coupled to the main gear and the third pump pad, wherein rotation of the main gear drives the third intermediate gear to drive the third plurality of pumps.

In another embodiment there is provide a method of operating a crop harvester having an engine and a plurality of pump devices operatively connected to the engine. The method includes: providing a drive shaft configured to be operatively connected to the engine; providing a clutch having an engaged position with the drive shaft and a disengaged position with the drive shaft; providing a first gear operatively connected to the clutch and to a first one of the plurality of pump devices; providing a second gear fixedly connected to the drive shaft and to a second one of the plurality of pump devices; disengaging the clutch from the drive shaft; operating the second one of the plurality of pump devices with the second gear immediately upon starting the engine; identifying a threshold engine speed, wherein the threshold engine speed is equal to or greater than a predetermined speed threshold; and after identifying the threshold engine speed, engaging the clutch to connect the first gear with the drive shaft.

In one example of this embodiment, the method includes further providing a fluid level sensor configured to determine an oil level in a reservoir configured to provide fluid to the plurality of pump devices. In a second example, the method includes preventing starting the engine if the fluid level determined by the fluid level sensor is less than a predetermined oil level. In a third example, the operating the second one of the plurality of pump devices includes operating one of a load sensing steering pump and a scavenge pump.

In a further embodiment, there is provided an agricultural vehicle including an engine having a drive shaft and a hydraulic power module. The hydraulic power module includes i) a main drive gear, the drive shaft extending through the main drive gear; ii) a clutch operatively connected to the drive shaft, the clutch having an engaged position and a disengaged position, wherein the engaged position of the clutch fixedly connects the main drive gear to the drive shaft and the disengaged position of the clutch disconnects the main drive gear drive from the drive shaft; iii) a first pump device directly coupled to the drive shaft, wherein the first pump device is driven by the drive shaft during rotation of the drive shaft; and iv) a second pump device indirectly connected to the main drive gear through the clutch, wherein the second pump device is driven by the drive shaft when the clutch is in the engaged position.

In one example of this embodiment, the agricultural vehicle further includes a first intermediate gear coupled to the main drive gear and the first pump device, wherein rotation of the main drive gear drives the first intermediate gear to drive the first pump device. In a second example, the agricultural vehicle includes a second intermediate gear coupled to the main gear and the second pump device, wherein rotation of the main gear drives the second intermediate gear to drive the second pump device. In a third example, the agricultural vehicle includes a hydraulic reservoir configured to hold a supply of hydraulic fluid for driving the first pump device and the second pump device, and a fluid level sensor disposed at the hydraulic reservoir, wherein the fluid level sensor is configured to transmit a level signal indicating a level of hydraulic fluid in the hydraulic reservoir. In a fourth example, the agricultural vehicle includes a controller operatively connected to the fluid level sensor and operatively connected to the clutch, wherein fluid level sensor transmits a level signal to the controller and the controller in response to the level signal prevents actuation of the clutch.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
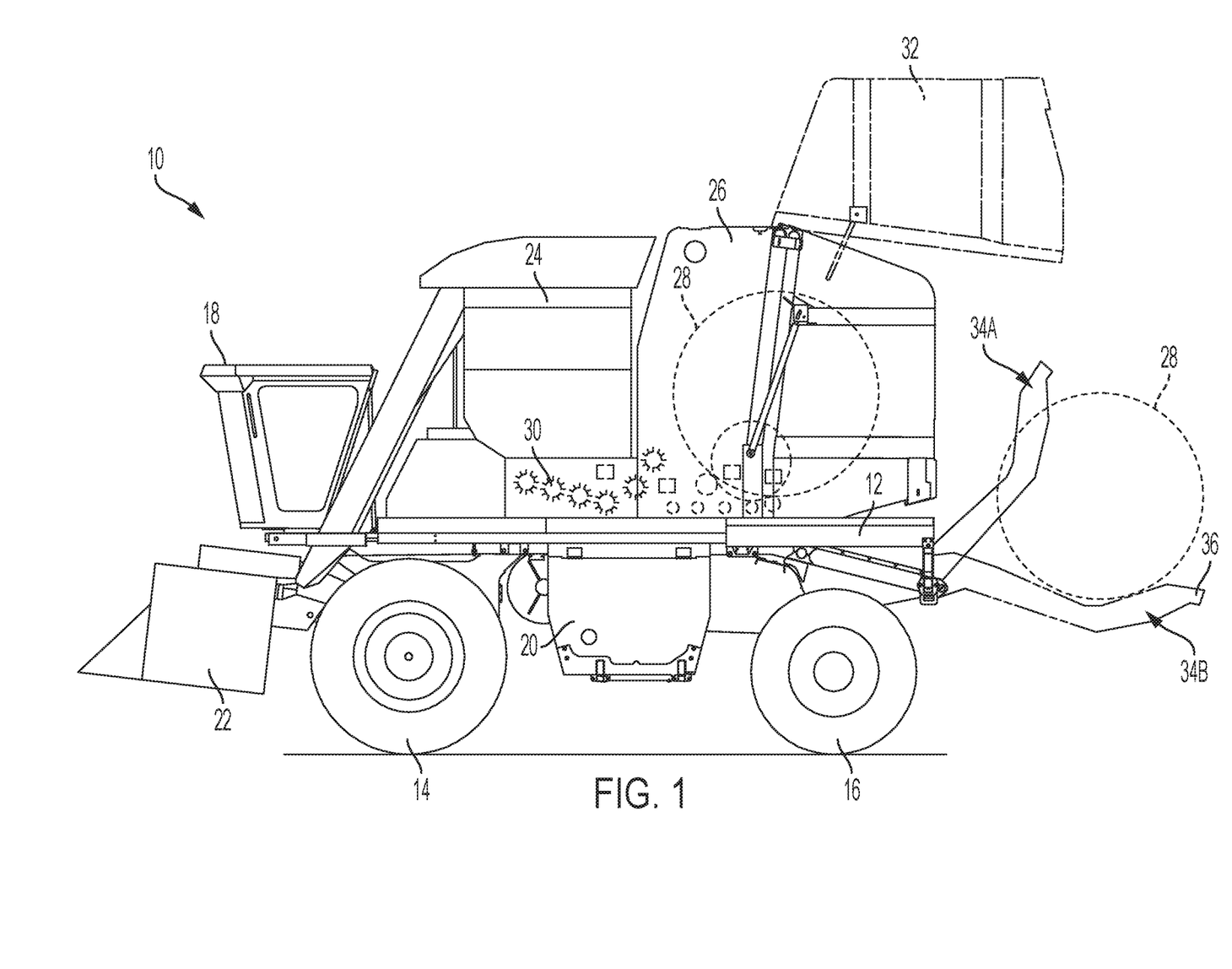
FIG. 1 is a side elevational view of a work vehicle, and more specifically, of an agricultural vehicle such as a cotton harvesting machine.

FIG. 1 is a side elevational view of an agricultural vehicle, and more particularly a cotton picker baler 10, including a frame 12 supported on a pair of front wheels 14 and a set of rear wheels 16. An operator cab 18 is mounted on the frame 12 and contains various controls for the vehicle 10 so as to be within the reach of a seated or standing operator. In one aspect, these controls may include a steering wheel and a control console including a display as would be understood by one skilled in the art. An engine 20 is mounted on the frame 12 beneath a housing and supplies power for driven components of the vehicle 10. The engine 20, for example, is configured to drive a transmission (not shown), which is coupled to drive the front wheels 14 at various selected speeds and either in forward or reverse modes. In different embodiments, the engine provides power to one or more motors or pumps. In other embodiments, the rear set of wheels is driven to move the vehicle, or all of the wheels are driven in an all-wheel drive configuration to move the vehicle 10.

While the described embodiments are discussed with reference to a cotton harvester, in addition to addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation including a seat, which is supported by the frame 12. The operator workstation, in different embodiments, includes one or more of an operator user interface, steering wheel, a joystick, and an accelerator pedal. Pedals for a brake and a clutch are also located in the cabin 18, but are not shown.

The user interface includes a plurality of operator selectable buttons configured to enable the operator to control the operation and function of the cotton harvester 10. The user interface, in one embodiment, includes a user interface screen or display having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

The cotton harvester 10 of FIG. 1 includes a plurality of electrical power circuits, each of which is located at a predetermined location within the cotton harvester 10. The electrical power circuits include, but are not limited to, power circuits for cab lights, switched 12 Volt power output, controller power inputs, valve powers, service lights, work lights, motors, recirculation fan(s), pressure fan(s), light bar lights, and load center inputs.

The cotton harvester 10 further includes a header 22, the position of which is adjustable with respect to the frame 12. The header 22 removes cotton growing in a field of cotton as the work machine 10 moves in a forward direction. An accumulator 24 receives the harvested cotton, where it is stored in sufficient quantity to enable a baler 26 to bale the cotton in a round bale 28. Cotton 30 leaves the accumulator 24 and moves into a baler zone where it is compressed and baled into the round bale 28. Once a bale 28 is complete, a gate 32 is opened where the bale 28 exits from the baler and onto a bale handler 34. The bale handler 34 is positionable between a relatively upright position 34A and a relatively horizontal position 34B. In other embodiments, an end 36 moves to a position toward the ground where the bale falls for later processing.

Figure 2:
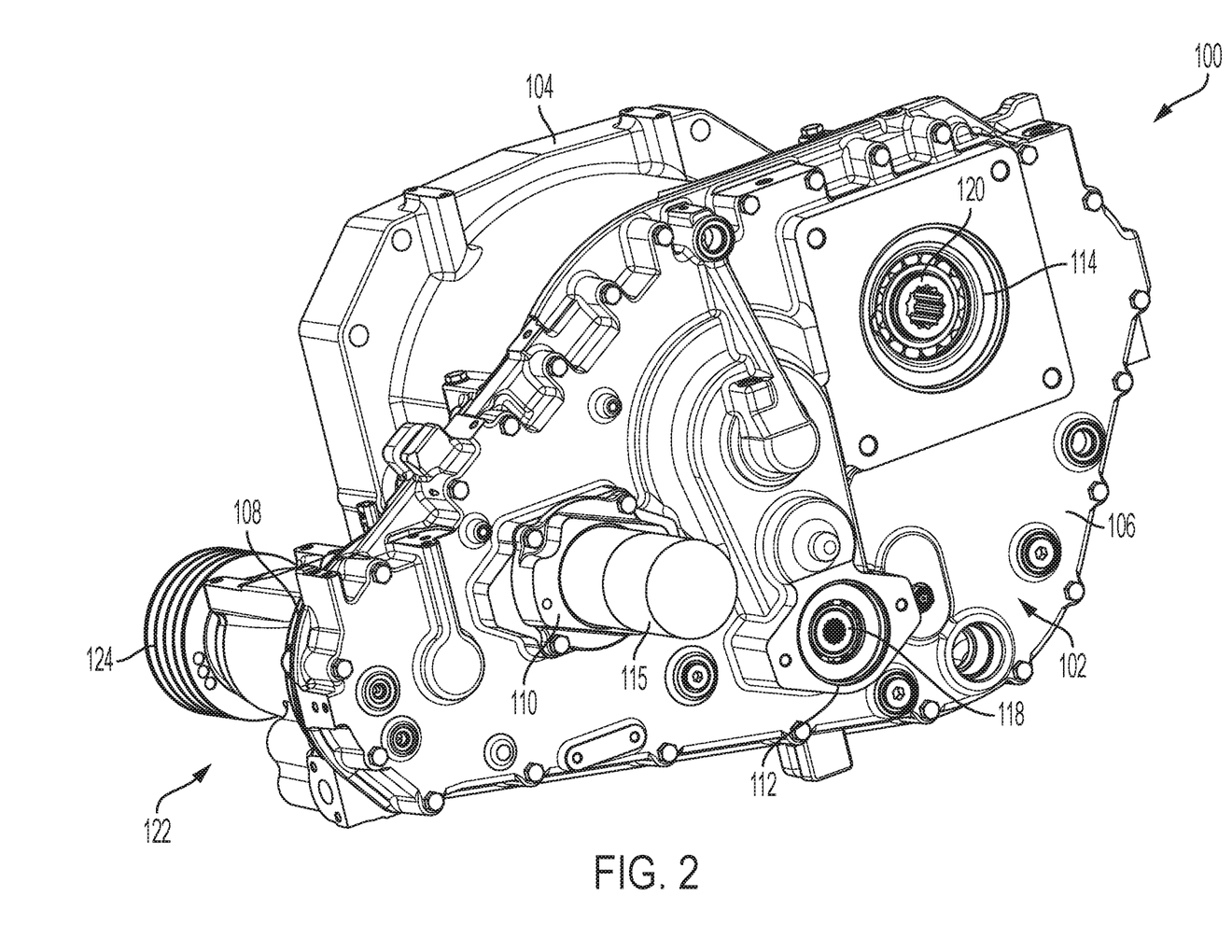
FIG. 2 is a is a perspective view of a pump drive system configured to couple to an engine of a work vehicle.

FIG. 2 is a perspective view of a pump drive system 100 configured to be coupled to an engine of a work vehicle. In one embodiment, the pump drive system 100 includes a pump drive system housing 102 operatively connected to an engine mounting flange 104. The housing 102 includes a rear cover 106 and a front cover 108 (See FIG. 3). The rear cover 106 defines a plurality of pump stack supports including a left pump stack support 110, a middle pump stack support 112, and a right pump stack support 114. The pump stack supports are also known as pump pads as each provides a pad for mounting a pump stack. Left, middle, and right correspond to the illustrated locations of each of the pump stacks in FIG. 2. In an actual embodiment when located in a vehicle, the locations of the pumps stacks are identified as being located at a front pump stack support 110, a lower or mid pump stack support 112, and a rear pump stack support 114.

In one embodiment, the left pump stack for a cotton stripper vehicle supports a pump stack having a header pump, a cleaner pump, and an auxiliary pump. In one embodiment for a cotton picker vehicle, the left pump stack supports a left unit pump, a right unit pump, and an auxiliary pump. The middle pump stack includes a load sensing steering pump, a scavenge pump, a beater drive pump, and a feeder drive pump. The right pump stack includes a propel pump and a baler pump. In other embodiments, other arrangements of pump stacks are contemplated. In different embodiments, the center pump stack and the right pump stack are common between the cotton stripper and the cotton picker.

Figure 3:
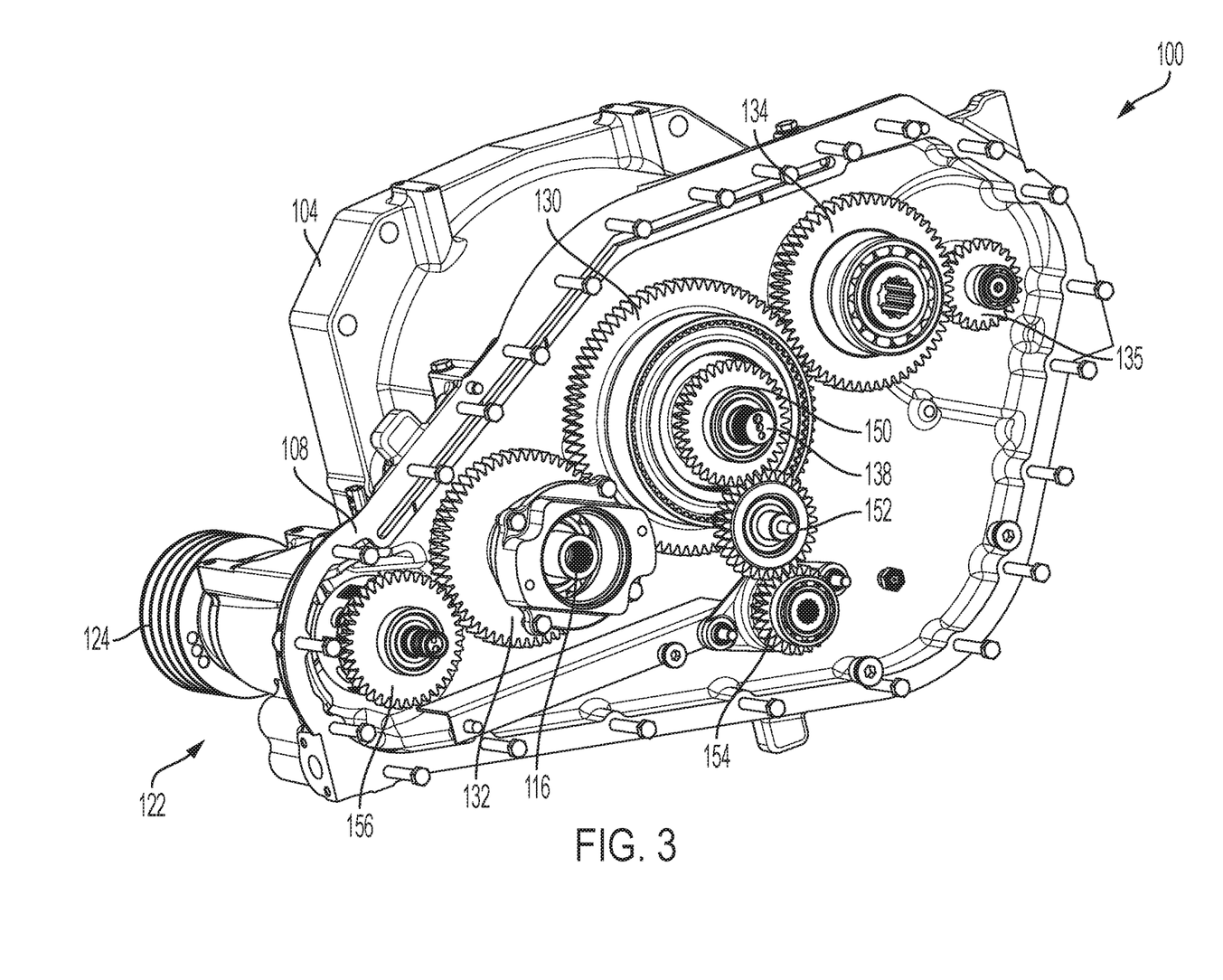
FIG. 3 is a perspective view of the pump drive system of FIG. 2 without a cover.

Each of the pump stack supports define an aperture configured to engage a pump stack and to be driven by a drive shaft. In FIG. 2, the left pump stack support 110 circumscribes a first clutch driven shaft 116 (as illustrated in FIG. 3), the middle pump stack support 112 circumscribes a direct drive shaft 118, and the right pump stack support 114 circumscribes a second clutch driven shaft 120. An exemplary pump stack 115 is illustrated in FIG. 2. In one or more embodiments, a pump stack includes one or more pumps that share the same input drive. For instance, the pump stack 115 includes a first and a second pump driven by the shaft 116.

A cotton fan drive 122 is located at one end of the housing 102 and includes a belt drive 124 configured to drive one or more belts for one or more cotton fans as would be understood by one skilled in the art.

The cotton fan drive 122, as well as the left pump stack located at the left pump stack support 110 and the right pump stack located at the right pump stack support 114 are each driven by a main drive gear 130. (See also FIGS. 4 and 5). The main drive gear 130 is operatively connected to a left pump stack gear 132, which drives the left pump stack 115, and to a right pump stack gear 134, which drives the right pump stack. The right pump stack gear 134 drives a fan gear 135 configured to drive an aspiration fan 137 that provides a vacuum for an air filter system having a precleaner to remove debris. The main drive gear 130 is clutch driven with a clutch assembly 136. The clutch assembly 136 is fixedly coupled to a center input shaft 138 which includes splines 140 configured to fixedly engage an output shaft 141 of an engine. The output shaft 141 is coupled to an isolation dampener coupler 142. Each of the main drive gear 130, the left pump stack gear 132, and the right pump stack gear 134 are indirectly coupled to the center input shaft 138 through the clutch assembly 136.

The clutch assembly 136 includes pads 144 which, in a first state, are in a position of non-engagement due to pressure supplied by a spring 146. A pressure plate 148 is configured to engage the main drive gear 130, when a fluid supplied to the clutch forces the pressure plate 148 to move the pads 144 into engagement. Once engaged, rotation of the shaft 138 provides a torque to rotate the main drive gear 130. Upon a release of the fluid pressure from the clutch assembly 136, the pads 144 return to the non-engaged state and any movement of the shaft 138 does not move the main drive gear 130. A second clutch assembly 149 (see FIG. 5) is included with the cotton fan drive assembly 122 and is separately controllable with respect to the first or master clutch 136.

Figure 4:
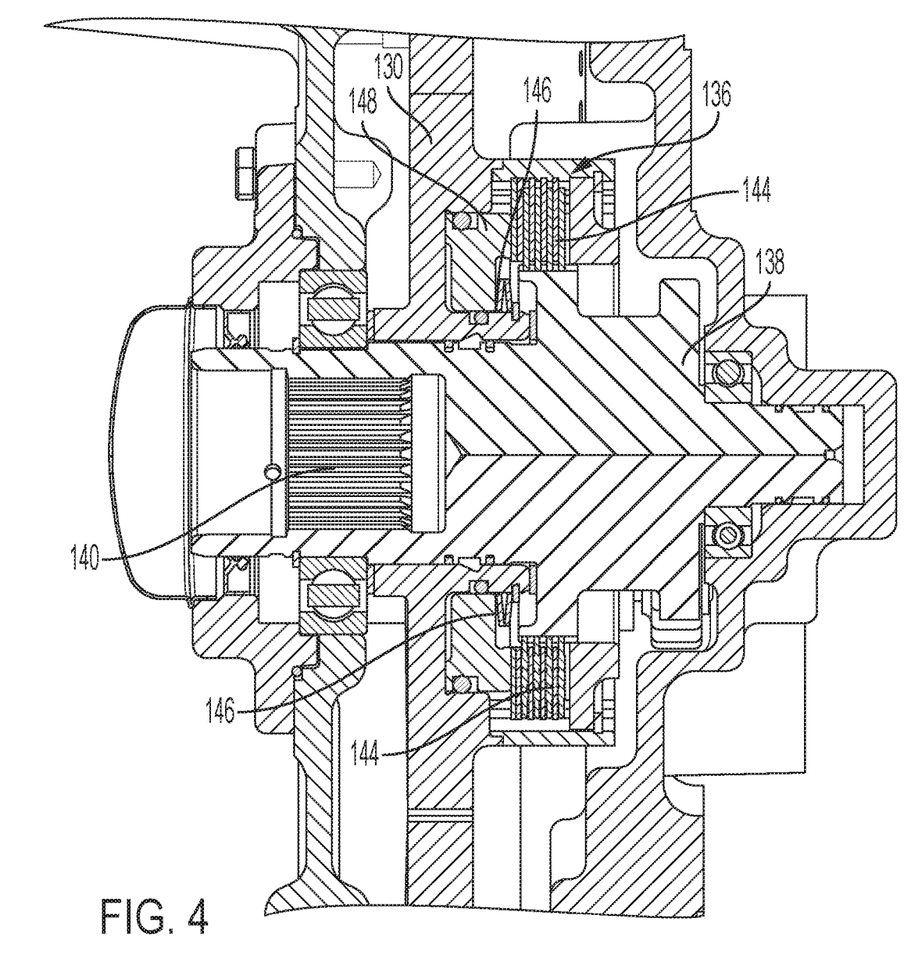
FIG. 4 is a section view of a portion of the pump drive system of FIG. 2 coupled to an engine housing.
Figure 5:
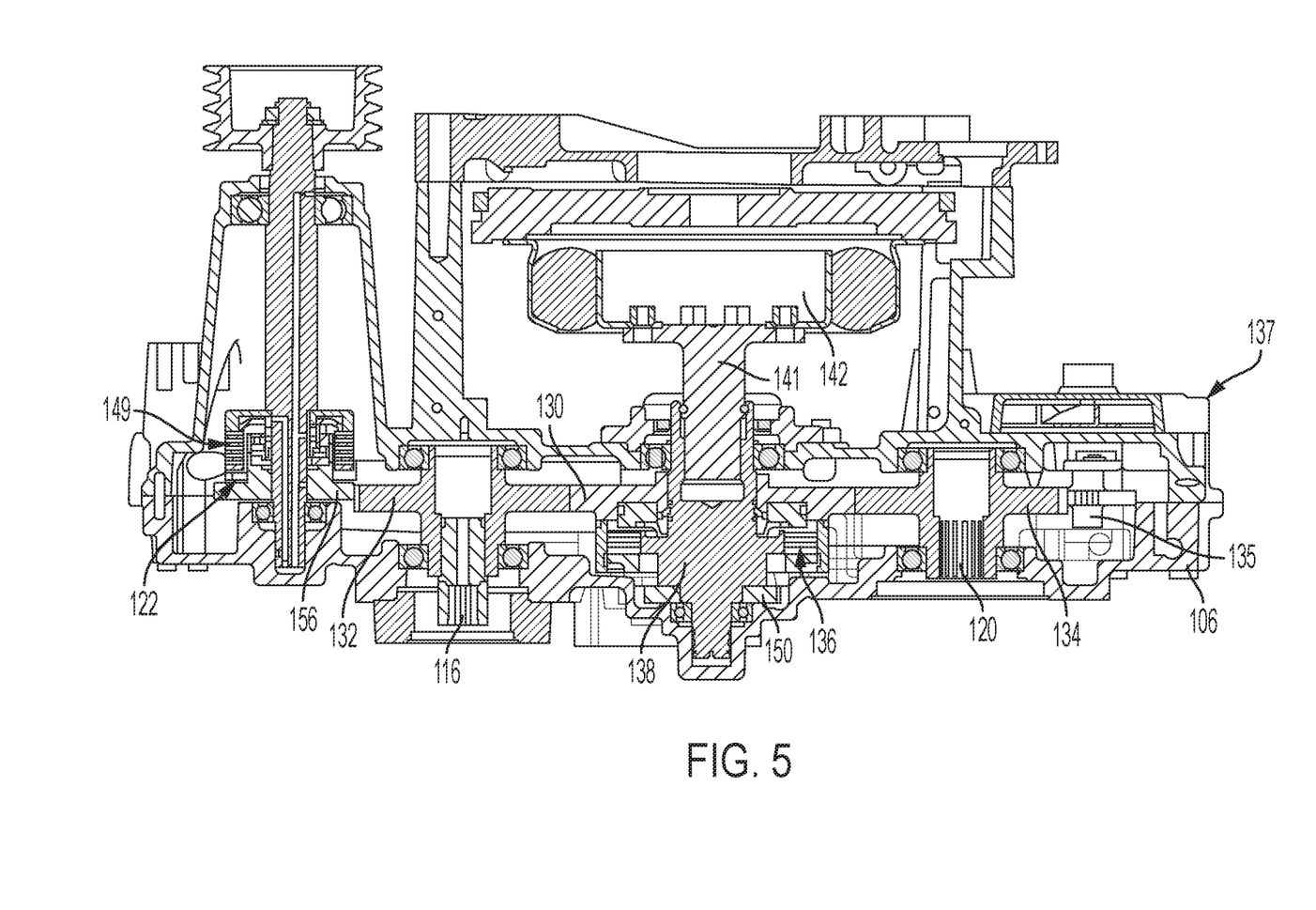
FIG. 5 is a section view of the pump drive system of FIG. 2 coupled to an engine flywheel.

As seen in FIG. 4, the clutch assembly 136 leverages a pressure applied/spring release mechanical control scheme.

The center input shaft 138 is driven directly by the engine through a rubber isolator coupler and input spline coupler 140. Input shaft 138 is connected to clutch assembly 136. After the engine is started or when a low oil pressure state no longer exists, the master clutch assembly 136 is engaged and pressurized oil is delivered to the cavity of the clutch assembly 136 to overcome the normal spring compression of springs 146 to fully engage the clutch plate surfaces for transmitting torque from the clutch housing assembly 136 to the main driven gear 130.

In one embodiment, the clutch assembly 136 is not engaged until the engine RPM (revolutions per minute) reaches a predetermined speed. In one embodiment, the predetermined engine speed is about 600 to 800 RPM. In other embodiments, other engine speeds or ranges of engine speeds are contemplated. Once the predetermined speed is achieved, the clutch engages automatically. An electronic control unit monitors the speed of the engine and once the engine speed reaches the desired speed, the electronic control unit communicates with a vehicle controller to engage the clutch. In other embodiments, a determination of engine RPM is made using speed sensors located at the engine shaft.

When the engine is turned off, the clutch assembly 136 disengages under an applied fluid pressure, since the fluid pressure engages the clutch and a release of fluid pressure disengages the clutch in response to the pressure applied by the spring 146. Other clutch assembly configurations are contemplated including those where clutch is disengaged when the engine is off and engaged when needed.

Returning to FIG. 3, the input shaft 138 extends through and is fixedly coupled to a secondary drive gear 150. In this embodiment, rotation of the drive shaft 138 rotates the secondary drive gear 150 whenever the drive shaft 138 rotates. The driving condition of the drive gear 150 is unlike rotation of the main drive gear 130, which is a clutched gear and which only rotates upon engagement of the clutch pads 144 in the clutch 136. Since the main drive gear 130 is clutch driven, the left pump stack gear 132 and the right pump stack gear 134 are also clutch driven.

The secondary drive gear 150 is operatively connected to a spur gear 152 which is operatively coupled to a middle pump stack gear 154. The gear 154 is located at the middle pump stack support 112 where a middle pump stack (not shown) is located.

The secondary drive gear 150 remains live (always connected) to the engine through the input shaft 138 and transmits to a torque to the middle pump stack through the idler gear arrangement including the spur gear 152 and the middle pump stack gear 154. Through this live pad arrangement, control and lube flow can be created immediately as the engine starting process begins. The left and right pads 110 and 114 are only driven when the master clutch 136 is engaged (after engine starting), whereas the center lower pump pad 112 remains engaged with the engine at all times.

A fan gear 156 is driven by the left pump stack gear 132 and the clutched main drive gear 130. Consequently, the cotton fan drive 122 is driven when both the clutch assembly 136 and the clutch assembly 149 are engaged.

Figure 6:
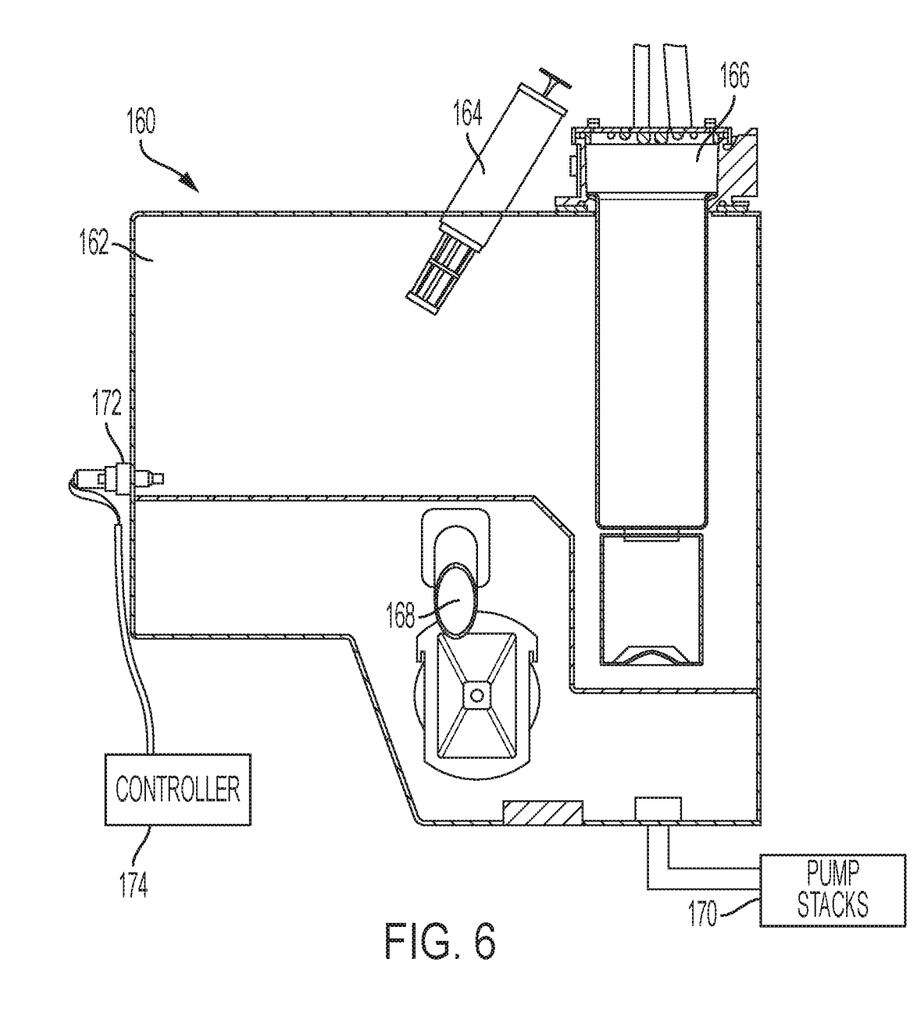
FIG. 6 illustrates a cross-sectional view of a hydraulic fluid reservoir.

FIG. 6 illustrates a cross-sectional view of a hydraulic fluid reservoir 160 that provides a pump inlet supply, acts as a buffer for varying hydraulic fluid volume needs, acts as a deaerator for air entrained in the hydraulic oil. The fluid reservoir includes a housing 162 configured to hold a predetermined amount of oil and includes a filler neck 164 configured to receive a spout delivering oil from a supply of oil and a filter housing 166 configured to house a filter for filtering the fluid moving through the fluid system. A port 168, located at a lower portion of the housing 162, is configured to deliver oil to one or more fluid operated or fluid cooled devices including one or more pump stacks. 170. In different embodiments, the port 168 is a suction port configured to draw under negative pressure to the one or more fluid operated or fluid cooled devices. The housing 160 provides other hydraulic function as is known by those skilled in the art.

A hydraulic oil level sensor 172 extends into an interior of the housing and is used to determine a level of oil within the housing. In one embodiment, the sensor 172 is operatively connected to a controller 174 which is either part of or is separate from an electronic control unit. In one embodiment, the controller 174 includes a processor and a memory.

The level of hydraulic oil within the housing is determined by gravity. The sensor 172 extends into the housing at a predetermined location to identify whether the level of the oil is above or below the location of the sensor. The sensor 172 transmits a signal to the controller 174 that indicates when the oil level is low. In other embodiments, the sensor 172 determines an amount of oil in the housing such that varying amounts of oil are determined. For instance, the sensor 172 provides a value of the amount of remaining oil that is used to indicate how much oil remains.

The signal provided by the sensor 172 is used to alert an operator that the reservoir is low with the expectation that the machine will be shut off as soon as possible to either correct an oil loss situation or to add oil due to normal service reasons. If the level of the oil falls below level of the sensor 172 between engine starts, a sufficient amount of oil may not be available at the pump suction ports 168 to meet the needs of the pumps 170. If the oil falls between engine starts, the sensor could provide an indication of a possible leak occurring during a machine off-season inactivity, or other reasons, such as a leak in the housing or in the fluid delivery lines.

The controller 174 provides an indicator to an operator, which in different embodiments includes a visual indication such as light provides within the cab or an audible indicator. In the case where the operator ignores an initial warning of low fluid within the reservoir 160 during the starting condition, the controller is configured to prevent the engine from being started. In this way, cavitation damage to the pumps which can to occur due to insufficient oil, is prevented. In another embodiment, the monitored level hydraulic fluid in the reservoir level during engine starting is used by the controller 174 to prevent master clutch 136 reengagement, if a proper level does not exist. In this event, the operator is notified that a low hydraulic state exists and is forced to address the fluid level situation before doing any damage to the pumps. The machine would not be operable with two pump stacks disabled (safety protected).

FIG. 6 also illustrates a pump orientation relative to the reservoir, where gravity is used to assist oil in moving to the suction inlets of the pumps that are located lower than the oil held in the housing 162. In another embodiment, the reservoir includes a visual sight gauge to provide the operator with the ability to check the oil level prior to engine startup. In an further embodiment and to reduce the chance that an operator does not check the level of the reservoir prior to starting the machine, the controller 174 provides for the actuation of only one of the three pump stacks to reduce the chance of a very expensive and time-consuming downtime failure of pumps and potentially the entire hydraulic system (due to system contamination potential).

Figure 7:
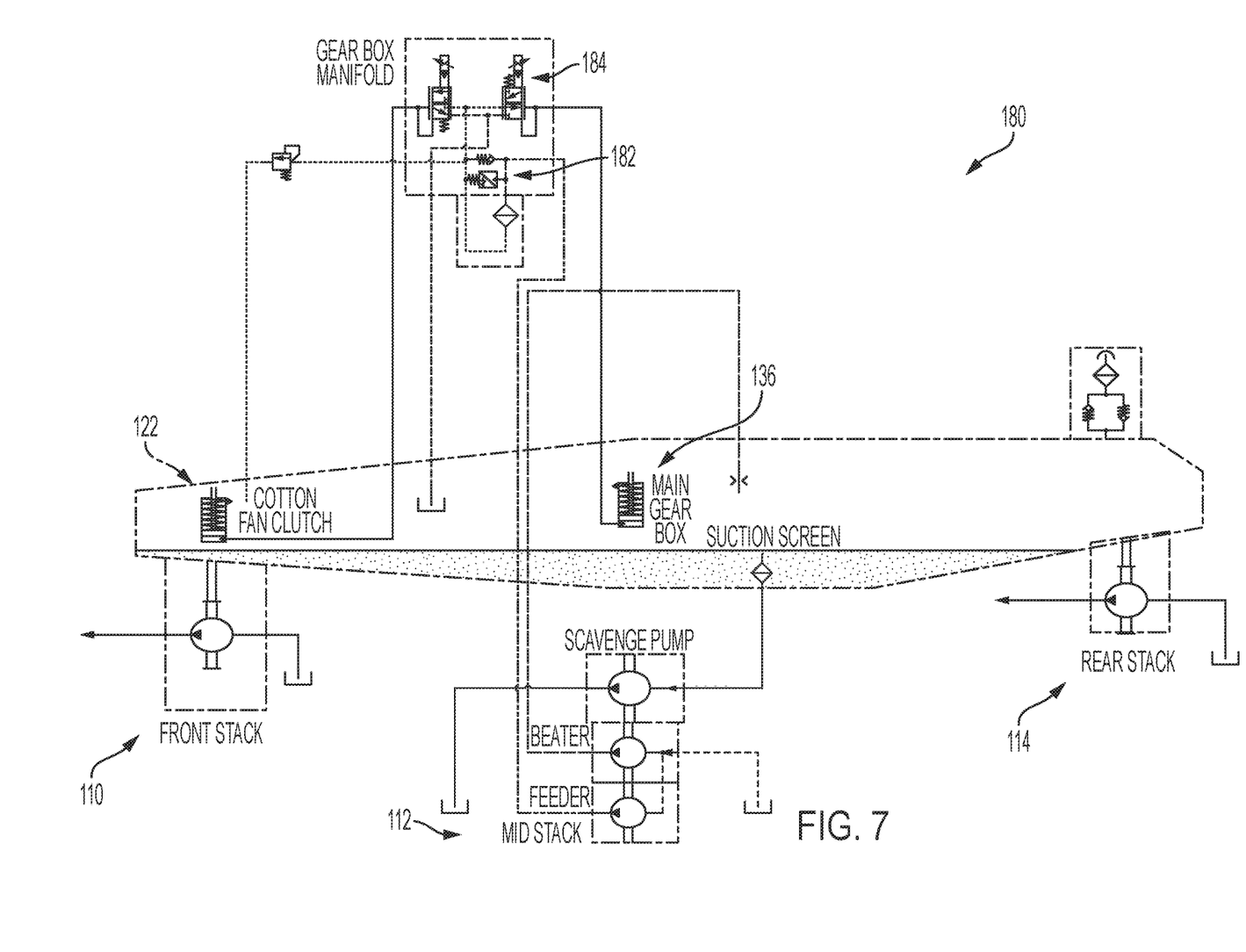
FIG. 7 illustrates a schematic diagram of a master clutch hydraulic control system.

FIG. 7 illustrates a schematic diagram of a master clutch hydraulic control system 180. During operation of the vehicle 10, pump stack 110 and pump stack 114 are disabled during at least a portion of the engine starting process. Pump stack 112, however, is enabled with the starting of the engine, and consequently the vehicle has vehicle control, lubrication, steering, and overall dry sump functions, immediately during the engine starting process. If oil from the reservoir had accumulated in another part of the system prior to engine starting, having the middle scavenge pump, which is one of the pumps of the pump stack 112, enabled with the engine start improves and corrects any oil level irregularities that could affect the inlet flow into the pumps on stacks 110 and 114.

FIG. 7 illustrates one example of the engagement and disengagement of a master clutch system such as described herein. For this particular application, gear pump stack 112 provides a control pressure source for the clutch system of clutch assembly 136. This same pump stack 112 also provides fluid flow for a feeder circuit that enables the pump to have dual purposes. The pressurized oil from pump stack 112 is allowed to pass through a check valve 182 and into the inlet port of normally open valve 184. In the de-energized (normally open) state of the valve 184, pressurized oil passes through the valve to the main gear box master clutch cavity which causes engagement of the clutch 136. When disengagement of the clutch 136 is desired (during engine starting and low oil safety), valve 184 is energized, allowing pressurized oil from the clutch cavity to be released to the sump of the pump drive gearcase, thereby allowing the compression springs to spread the clutch plates apart and disengage the clutch 136. As long as valve 184 stays energized, the clutch will remain disengaged.

In one example process for starting the engine with this clutch control scheme, the valve 184 is at a de-energized (normally open) state at the instant that the starting process begins. Because pump stack 112 is a live pump stack provided for engine operation, pump stack 112 quickly begins to build pressure and begins to engage the clutch assembly 136. After a very low engine speed is detected, for instance 100 RPM, or after a short time duration of starting, valve 184 is energized and pressure from the clutch cavity is released to a sump and the clutch assembly 136 in disengaged. Engine speeds of other than 100 RPM are contemplated. With the center pump stack parasitic load of the pump stack 112 being present and the parasitic loads of pump stacks 110 and 114 being absent, the engine starts relatively quickly. After the engine reaches some defined speed that defines that it is running, for instance 800 RPM, valve 184 is de-energized to begin the clutch engagement process. Engine speeds of other than 800 RPM are contemplated. In one embodiment, valve 184 is a proportional valve so a ramp rate for engagement and disengagement of the clutch assembly 136 occurs to reduce shock loads. A secondary criteria to enable de-energization of valve 184 is that the hydraulic reservoir 160 has satisfactory level. By using a normally open valve 184 scheme, in the event that valve 184 cannot be energized or is stuck in the open position, a machine in normal ambient temperature conditions will still likely start with the higher parasitic loads By controlling the actuation of the pump stack 112, but not pump stacks 110 and 114, cavitation or excessive air inlet conditions at the pumps are reduced or eliminated that result from an insufficient amount of hydraulic oil in the reservoir at startup. Being able to prevent a pump stack from being engaged when insufficient supply oil is available can prevent catastrophic pump or hydraulic system damage or premature wear.

Another advantage of the electro-hydraulic based master clutch arrangement is that service personnel can purposely dis-engage the master clutch when diagnosing engine or pump drive issues. The ability to disengage the master clutch is a beneficial feature for both manufacturing runoff booth and dealer diagnostics and troubleshooting.

Cotton harvesters, in particular, in different configurations, include the use of a relatively large engine, and consequently can suffer from poor engine starting. By adding the clutch assembly to only drive pumps necessary for starting but not to others, engine starting of a cotton harvester incorporating the present disclosure is greatly improved. By only driving simple gear pumps at startup, starting of a cold engine is easier to accomplish. By having a system incorporating a clutch assembly configured to drive only certain pumps at startup, a higher capacity starting system, such as using a 24 volt starter is not needed, and a 12 volt electrical system architecture and associated voltage is sufficient. By improving the ease of starting the engine, the reliability of the starter is improved. Consequently, the present disclosure provides improved starting and improves the reliability of pumps subject to cavitation issues.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic power module for a crop harvester having an engine, the hydraulic power module comprising:
   a main drive gear;
   a drive shaft extending through the main drive gear;
   a clutch operatively connected to the drive shaft, the clutch having an engaged position and a disengaged position, wherein the engaged position of the clutch fixedly connects the main drive gear to the drive shaft and the disengaged position of the clutch disconnects the main drive gear drive from the drive shaft;
   a first pump device directly coupled to the drive shaft, wherein the first pump device is driven by the drive shaft during rotation of the drive shaft;
   a second pump device indirectly connected to the drive shaft through the clutch, wherein the second pump device is driven by the drive shaft when the clutch is in the engaged position.

2. The hydraulic power module of claim 1 wherein the first pump device includes a first plurality of hydraulic pumps wherein each one of the first plurality of pumps provides a different function.

3. The hydraulic power module of claim 2 wherein one of the first plurality of pumps comprises a steering pump and another of the first plurality of pumps comprises a scavenge pump.

4. The hydraulic power module of claim 2 wherein the second pump device includes a second plurality of hydraulic pumps wherein each of the second plurality of pumps provides a different function.

5. The hydraulic power module of claim 4 wherein one of the second plurality of pumps comprises a header pump and another of the second plurality of pumps comprise a cleaner pump.

6. The hydraulic power module of claim 4 further comprising a third pump device including a third plurality of third pumps wherein each of the third plurality of pumps provides a different function.

7. The hydraulic power module of claim 2 further comprising a first intermediate gear coupled to a secondary drive gear and the first pump device, wherein rotation of the secondary drive gear drives the first intermediate gear to drive the first pump device.

8. The hydraulic power module of claim 7 further comprising a second intermediate gear coupled to the main gear and the second pump device, wherein rotation of the main gear drives the second intermediate gear to drive the second pump device.

9. The hydraulic power module of claim 8 further comprising a hydraulic reservoir configured to hold a supply of hydraulic fluid for driving the first pump device and the second pump device and a fluid level sensor disposed in the hydraulic reservoir, wherein the fluid level sensor is configured to transmit a level signal indicating a level of hydraulic fluid in the hydraulic reservoir.

10. The hydraulic power module of claim 9 further comprising a controller operatively connected to the fluid level sensor and operatively connected to the clutch, wherein the fluid level sensor transmits the level signal to the controller and the controller in response to the level signal prevents the the clutch from being in the engaged position.

11. The hydraulic power module of claim 10 further comprising a third intermediate gear coupled to the main gear and a third pump device, wherein rotation of the main gear drives the third intermediate gear to drive the third pump device.

12. A method of operating a crop harvester having an engine and a plurality of pump devices operatively connected to the engine, the method comprising:
providing a drive shaft configured to be operatively connected to the engine;
providing a clutch having an engaged position with the drive shaft and a disengaged position with the drive shaft;
providing a first gear operatively connected to the clutch and to a first one of the plurality of pump devices;
providing a second gear fixedly connected to the drive shaft and to a second one of the plurality of pump devices;
disengaging the clutch from the drive shaft;
operating the second one of the plurality of pump devices with the second gear immediately upon starting the engine;
identifying a threshold engine speed, wherein the threshold engine speed is equal to or greater than a predetermined speed threshold; and
after identifying the threshold engine speed, engaging the clutch to connect the first gear with the drive shaft.

13. The method of claim 12 further comprising providing a fluid level sensor configured to determine an oil level in a reservoir configured to provide fluid to the plurality of pump devices.

14. The method of claim 13 further comprising preventing starting the engine if the oil level determined by the fluid level sensor is less than a predetermined oil level.

15. The method of claim 12 wherein the operating the second one of the plurality of pump devices includes operating one of a load sensing steering pump and a scavenge pump.

16. An agricultural vehicle comprising:
an engine having a drive shaft;
a hydraulic power module including: i) a main drive gear, the drive shaft extending through the main drive gear; ii) a clutch operatively connected to the drive shaft, the clutch having an engaged position and a disengaged position, wherein the engaged position of the clutch fixedly connects the main drive gear to the drive shaft and the disengaged position of the clutch disconnects the main drive gear drive from the drive shaft, iii) a first pump device directly coupled to the drive shaft, wherein the first pump device is driven by the drive shaft during rotation of the drive shaft; and iv) a second pump device indirectly connected to the main drive gear through the clutch, wherein the second pump device is driven by the drive shaft when the clutch is in the engaged position.

17. The agricultural vehicle of claim 16 further comprising a first intermediate gear coupled to a secondary drive gear and the first pump device, wherein rotation of the secondary drive gear drives the first intermediate gear to drive the first pump device.

18. The agricultural vehicle of claim 17 further comprising a second intermediate gear coupled to the main gear and the second pump device, wherein rotation of the main gear drives the second intermediate gear to drive the second pump device.

19. The agricultural vehicle of claim 18 further comprising a hydraulic reservoir configured to hold a supply of hydraulic fluid for driving the first pump device and the second pump device, and a fluid level sensor disposed at the hydraulic reservoir, wherein the fluid level sensor is configured to transmit a level signal indicating a level of hydraulic fluid in the hydraulic reservoir.

20. The agricultural vehicle of claim 19 further comprising a controller operatively connected to the fluid level sensor and operatively connected to the clutch, wherein the fluid level sensor transmits a level signal to the controller and the controller in response to the level signal prevents actuation of the clutch.

* * * * *